United States Patent [19]
Singh

[11] Patent Number: 5,898,747
[45] Date of Patent: Apr. 27, 1999

[54] APPARATUS SUITABLE FOR TRANSPORTING AND STORING NUCLEAR FUEL RODS AND METHODS FOR USING THE APPARATUS

[76] Inventor: Krishna P. Singh, 230 Normandy Cir., Palm Harbor, Fla. 34368

[21] Appl. No.: 08/858,114

[22] Filed: May 19, 1997

[51] Int. Cl.$^6$ .......................... G21F 5/012; G21C 19/07
[52] U.S. Cl. ........................................................ 376/272
[58] Field of Search ....................... 376/272; 250/506.1, 250/507.1

[56] References Cited

U.S. PATENT DOCUMENTS

| | | | |
|---|---|---|---|
| 4,770,844 | 9/1988 | Davis, Jr. | 376/272 |
| 4,800,283 | 1/1989 | Efferding | 250/507.1 |
| 5,063,299 | 11/1991 | Efferding | 250/507.1 |
| 5,232,657 | 8/1993 | Kovacik et al. | 376/272 |
| 5,245,641 | 9/1993 | Machado et al. | 376/272 |
| 5,373,540 | 12/1994 | DeCooman, Sr. et al. | 376/272 |
| 5,406,601 | 4/1995 | Hinderer et al. | 376/272 |
| 5,438,597 | 8/1995 | Lehnert et al. | 376/272 |
| 5,513,232 | 4/1996 | Jones et al. | 376/272 |
| 5,546,436 | 8/1996 | Jones et al. | 376/272 |
| 5,612,543 | 3/1997 | Wenner et al. | 250/507.1 |
| 5,651,038 | 7/1997 | Chechelnitsky et al. | 376/272 |
| 5,668,843 | 9/1997 | Wasinger | 376/272 |

Primary Examiner—Charles T. Jordan
Assistant Examiner—M. J. Lattig
Attorney, Agent, or Firm—Michael B. Fein

[57] ABSTRACT

Apparatus suitable for transporting and storing nuclear fuel rods comprising a basket having storage cells formed from a honeycomb gridwork of metal plates in a rectilinear configuration, the plates welded to each other at their intersections so that all contiguous corners of the storage cells formed by the gridwork are completely connected so as to allow conduction heat transfer, the metal plates having neutron absorber material positioned in areas which form walls of the storage cells.

Method of making an apparatus suitable for transporting and storing nuclear fuel rods comprising a) providing metal plates having slots and having neutron absorber material positioned on sides of the metal plates, b) arranging the plates so that the slots intersect to form a honeycomb gridwork of storage cells having contiguous corners and having the neutron absorbing material on sides of the storage cells, and c) welding the plates to each other at their intersections so that all contiguous corners of the storage cells formed by the gridwork are completely connected so as to allow conduction heat transfer and to provide a rigid structure.

30 Claims, 16 Drawing Sheets

APPARATUS SUITABLE FOR TRANSPORTING AND STORING NUCLEAR FUEL RODS AND METHODS FOR USING THE APPARATUS

BACKGROUND OF THE INVENTION

1. Field of the Invention

This invention relates to containers for storage and transportation of spent nuclear fuel.

2. Description of the Prior Art

Spent nuclear fuel (SNF) discharged from reactors emits highly piercing gamma and neutron radiation and thermal energy. SNF is typically stored in deep pools filled with water to dissipate heat and to attenuate the gamma and neutron radiation generated by the fuel. An alternative to storing the SNF in water filled pools (wet storage) consists of the so-called dry storage concept wherein the SNF is stored in a configuration inside a heavy-walled vessel referred to as the "cask." Dry storage systems usually consist of two basic constituents, a multi-purpose canister (MPC) and an overpack. The term MPC refers to a fuel basket within an enclosure vessel. After SNF is placed in a fuel basket, the fuel basked is placed in an enclosure vessel, and the resultant MPC, which is the "fuel confinement system," is then placed into a neutron/gamma isolation device called an "overpack." The MPC within the overpack is referred to as the "dry storage system." There are two types of overpack: storage overpacks and transportation overpacks. The transportation overpack can be used for transportation as well as storage, and is therefore dual purpose.

Lehnert, et al., U.S. Pat. No. 5,438,597 assigned to Vectra Technologies, Inc., discloses one MPC in which spent nuclear fuel rods are stored in substantially square shaped sleeves which are maintained in spaced apart axial alignment relative to one another by a plurality of generally circular plates, having a plurality of generally square shaped apertures formed therethrough. The plates are maintained in spaced apart axial alignment relative to one another by eight elongate rectangular plates. The Vectra spacer disk technology fuel basket is stored in a concrete horizontal storage module designed to withstand all normal and abnormal condition loads, such as earthquakes, tornadoes, flooding and other natural phenomena, as well as complete loss of ventilation. The Vectra MPC is designed to be transportable, but the overpack is not.

MPCs have also been proposed by Hinderer, et al., U.S. Pat. No. 5,406,601 assigned to Babcock & Wilcox Company, in which the basket is formed from multiple layers of rowed plates that cooperate with the cask body to provide the required radiation shielding, thermal, and structural requirements. The plates have complementary shapes and partial hex grooves machined therein, such that complete channels for the fuel cells are formed when the plates are mated for insertion into the cask body. The plates have narrowed diameter sections and are held together by bands around the circumference of the plates at these sections.

Efferding, U.S. Pat. No. 4,800,283 assigned to Westinghouse Electric Corp., disclosed a basket structure having a cell assembly of square cross-sectioned tubes formed from two sets of parallel plates which are slotted approximately one-half the distance of their lengths and interfitted in "egg crate" fashion to define an array of square, elongated cells which are welded along their entire lengths at every intersection in order to rigidify the structure. Disposed in each of the cells defined by the interlocking plates is an elongated container having a square cross-section. The outside walls of each of the elongated containers is clad with neutron-absorbing material such as Boron carbide encased in aluminum. Mounting brackets in the corners of each of the cells serve to mount and uniformly space each of the containers from the interior walls of its respective cell. Former plates of the basket structure having a circular outer edge serve as shock absorbing members which circumscribe the cell assembly and maintain the cell assembly within the cylindrical vessel of the transportation cask. The transportation cask is preferably made of carbon steel and the circular former plates are preferably made of aluminum, which expands when subjected to the heat of the fuel rods and thereby expand within the cylindrical vessel. In fact, the cell assembly and former plates of the basket structure are formed from the same type of aluminum alloy, i.e., aluminum 6061–T45, for reasons which are set forth in the patent.

Sierra Nuclear discloses a dry storage system using a storage-only concrete storage cask, and a dual purpose steel welded basket for both transport and storage of spent nuclear fuel rods. The fuel basket is a welded assembly fabricated from square steel tubes. Structural support in the horizontal direction is provided by curved, horizontal spacer disks located along the length of the basket assembly. The fuel basket is placed in a concrete cask which is accomplished by employing a transfer cask or shielding bell to move a loaded fuel basket to the concrete cask.

In spite of the many attempts by other research and design teams, no one has proposed a multi-purpose canister or fuel basket having the capability to store multiple fuel assemblies and provide axial as well as vertical support, have the capability to transport the heat generated by the fuel assemblies to its outside surface, be sufficiently rugged to enable convenient handling, and capable of withstanding handling accidents.

Furthermore, no one has provided a concrete overpack structure which effectively insulates the outside environment from the gamma and neutron radiation while effectively and efficiently rejecting heat to the atmosphere, while at the same time being sufficiently rugged to withstand an accidental tipover event, as well as earthquakes, tornadoes, and other extreme environmental events.

The thermal problem in a cask consists of rejecting the decay heat produced by the spent nuclear fuel such that the temperature of the fuel cladding remains below the threshold value at which long-term temperature effects would not degrade the cladding. For a given ambient temperature, the temperature of the fuel cladding would rise as the resistance in the path of heat transmission is increased. Recognizing that the resistance to conductive heat transfer offered by a 1-inch gap filled with air is equal to nearly 2,000 inches of steel, it is quite apparent that introducing even a small gap (say, 0.25 inch), would greatly magnify the thermal resistance offered by an overpack wall 12 inches thick. In other words, the gaps exacerbate the thermal problem in cask design in a most direct and significant manner.

In the pre-MPC era, the cask designer was able to persuade himself that the basket-to-cask gap would be closed or greatly diminished by a tight manufacturing tolerance and by the thermal growth of the basket during operation. The only location where a designer had to contend with an undiminished physical gap was the spacing between the stored fuel and the storage cell wall.

The assumed absence of a serious gap barrier elsewhere in the cask enabled the designers to utilize the so-called "box-and-disk" design illustrated in the Lenhert patent, supra. In this design, each storage cell is defined by a box;

an array of boxes is arranged in a square grid pattern maintained by a number of transverse disks. Square holes cut in the disks provide lateral support to the boxes; an array of disks reduce the unsupported longitudinal span of the boxes and provide the path of heat transmission to the overpack. The designers often utilized a strong, but poor, heat conductor alloy material such as SA240–304 S/S, and highly conductive, but weak, aluminum disks in an alternating pattern to respectively provide structural support and heat transfer path. The Lehnert patent shows a typical box-and-disk construction.

In NAC International's NAC-STC fuel basket, the box is made from a thin (18 gauge) sheet metal stock. Panels of Boron carbide encased in aluminum are laid on the four sides of the box and secured in place by four 0.019 inch-thick sheathing panels. Welding the sheathing to the box to create a sealed chamber for Boron carbide encased in aluminum leads to excessive heat induced deformation and warpage of the box. For boxes made of low conductivity materials such as austenitic stainless steel, severe welding induced warpage is simply unavoidable.

Disks, made from austenitic stainless steel, would experience deformation as well if the square holes are made by burning and grinding. Heat induced warpage of the disks can be mitigated, however, if the holes are made by broaching.

STC's designers seem to have recognized the potential of warpage of the fabricated composite box and sought to remedy the fit-up problem by making relatively large square holes in the disks.

In summary, the box/disk construction forces the designer to introduce gaps which are most detrimental to the transmission of heat. The manufacturing mandated box-to-disk gaps are the essence of the "thermal problem" in this design. For the MPC construction to be viable, we have found it is necessary that gaps within the basket not essential to its operation, and needed only to enable manufacturing assembly, be eliminated. Otherwise, the heat duty rating of the cask will be severely limited.

Some of the structural frailties of the box and disk design become clear when one considers that the deformation of the boxes and disks in the manufacturing process makes the condition of support at the box-hole interface largely uncertain. A most inimical situation would develop if the deformation of the disk ribs and the box led to a knife edge contact condition, since under such condition the disk may shear the thin (0.019 inches thick) sheathing under a horizontal drop event. Even under the ideal conditions of support, the inherent structural limitations of the box and disk design is easily understood when a horizontal drop event is considered.

Calculations show that stress levels in the boxes for a horizontal drop event typical of transport conditions are too high and raise the concern that under a horizontal drop event, the boxes will bulge, reducing the flux trap gap between them with direct consequence to the package's nuclear criticality characteristics.

Prior closure systems for MPCs use multiple circulator disk-shaped lids, the first being thick to provide radiation shielding for subsequent welding operations. The first lid is welded in place if there are two lids, or not welded in place if there are three lids. The second lid provides an additional seal or in the case of three lids provides spacing and shielding. After each lid is installed, welding machines are set up and the weld must be inspected, causing the operator to receive radiation exposure. Each additional lid requires set up time for the welding machine.

SUMMARY OF THE INVENTION

It is therefore an object of the present invention to provide a dry storage apparatus for spent nuclear fuel rods which has the capability to store multiple fuel assemblies and provide axial as well as vertical support. It is another object to provide fuel basket assemblies which are capable of transporting heat to the outside surface and are rugged and convenient to handle, as well as capable of withstanding extreme handling accidents and environment events.

Another object is to provide an overpack structure which is capable of vertical orientation but resistant to large deceleration events from impact due to a tipover or tornado missiles, as well as being an efficient heat rejecter, a highly effective gamma and neutron arrestor, and an all-weather enclosure vessel, with easily maintainable exterior.

Another object is to provide an improved closure system for the MPC which minimizes worker exposure to radiation and maximizes radiation shielding.

These objects and others which will become apparent from the following disclosure, are achieved by the present invention, which in one aspect comprises a basket having storage cells formed from a honeycomb gridwork of metal plates in a rectilinear configuration, said plates welded to each other at their intersections so that all contiguous corners of the storage cells formed by said gridwork are completely connected so as to allow conduction heat transfer, said metal plates having neutron absorber material positioned in areas which form walls of said storage cells.

In another aspect, the invention comprises such a basket wherein angular metal plates are welded longitudinally within storage cells, especially when the angular metal plates have neutron absorbing material on at least part of their surfaces.

A still further aspect of the invention is method of making such basket comprising a) providing metal plates having slots and having neutron absorber material positioned on sides of said metal plates, b) arranging said plates so that said slots intersect to form a honeycomb gridwork of storage cells having contiguous corners and having said neutron absorbing material on sides of said storage cells, and c) welding said plates to each other at their intersections so that all contiguous corners of the storage cells formed by said gridwork are completely connected so as to allow conduction heat transfer and to provide a rigid structure.

Another aspect of the invention is the overpack which comprises a cylindrical inner metal shell, a cylindrical outer metal shell, and a cylindrical concrete structure between said metal shells.

Another aspect of the invention is the closure system for the MPC which comprises a generally round disk-shaped closure plate having a recess on its top perimeter and a closure ring adapted to fit in the recess so that after the closure plate is seal welded to the top of the metal shell of the MPC, the closure ring, preferably in two parts, is seal welded to the closure plate and metal shell so as to provide a redundant seal for the MPC.

The invention also comprises the complete storage assembly, which includes the overpack, having the basket structure holding spent nuclear fuel rods inserted therein.

DETAILED DESCRIPTION OF THE INVENTION AND THE PREFERRED EMBODIMENTS

Figure 1:
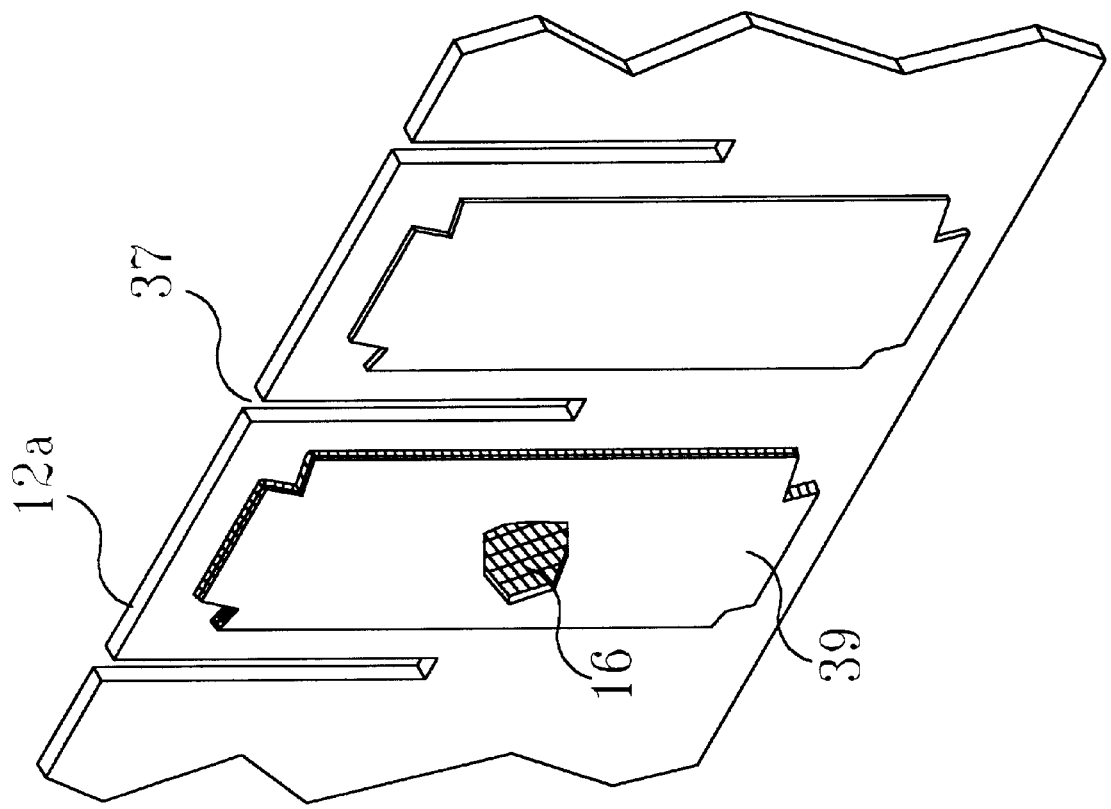
FIG. 1 is a side perspective view, partially in cross-section, of a portion of a slotted plate with neutron absorbing material and metal sheathing according to the invention.
Figure 2:
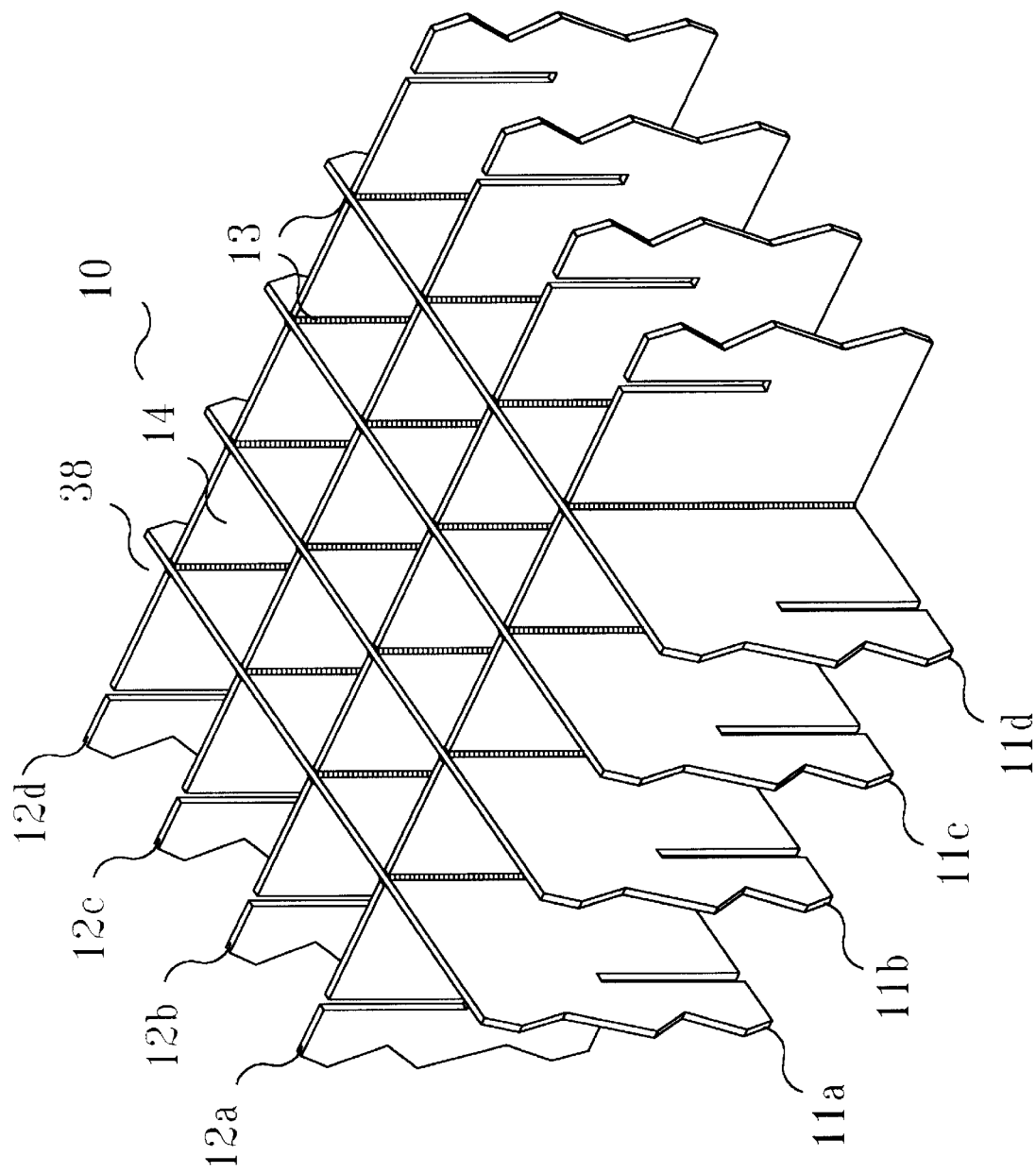
FIG. 2 is a perspective view, partially in section, of a slotted plate assembly portion of a basket according to the invention, not showing neutron absorbing material.

With reference to the drawings wherein like numerals designate like components of the invention throughout all of the several figures,fuel basket 10 is shown in FIGS. 2, 3, 4, 5, 6, 7, 8, 9, 10, 11, 12, 14, and 15. The basket 10 is formed from a honeycomb gridwork 38 of plates 11a–11d and 12a–12d having neutron absorber material 16 positioned in areas which form walls of storage cells formed by the honeycomb structure. A portion of one plate 12a is shown in FIG. 1.

The invention also comprises the MPC 43, wherein a metal shell 19 cylindrically encircles the basket 10, shown in cross section in FIGS. 10, 11, 12, and 15.

Figure 13:
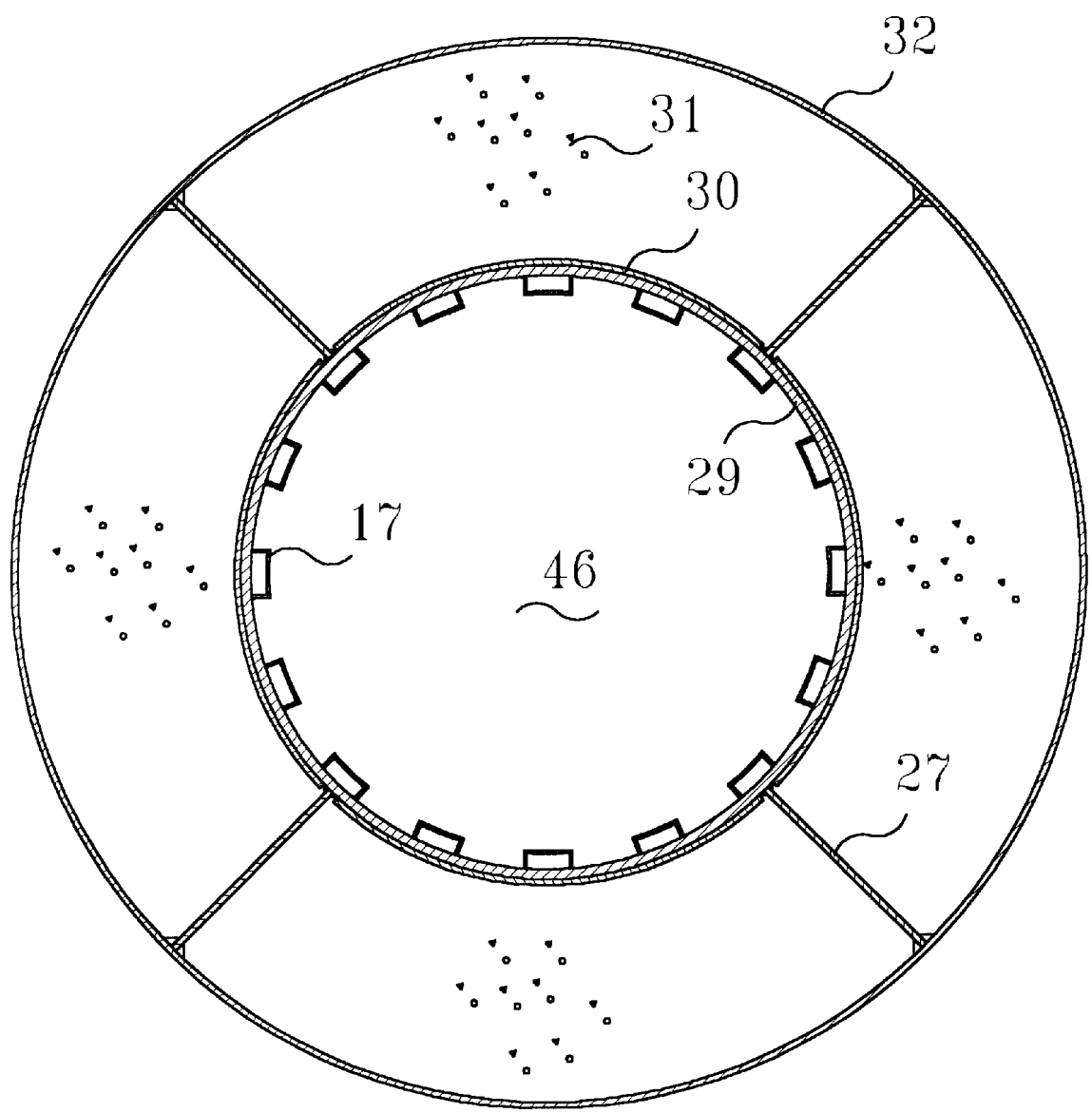
FIG. 13 is a top cross-sectional view of a storage overpack according to the invention.
Figure 14:
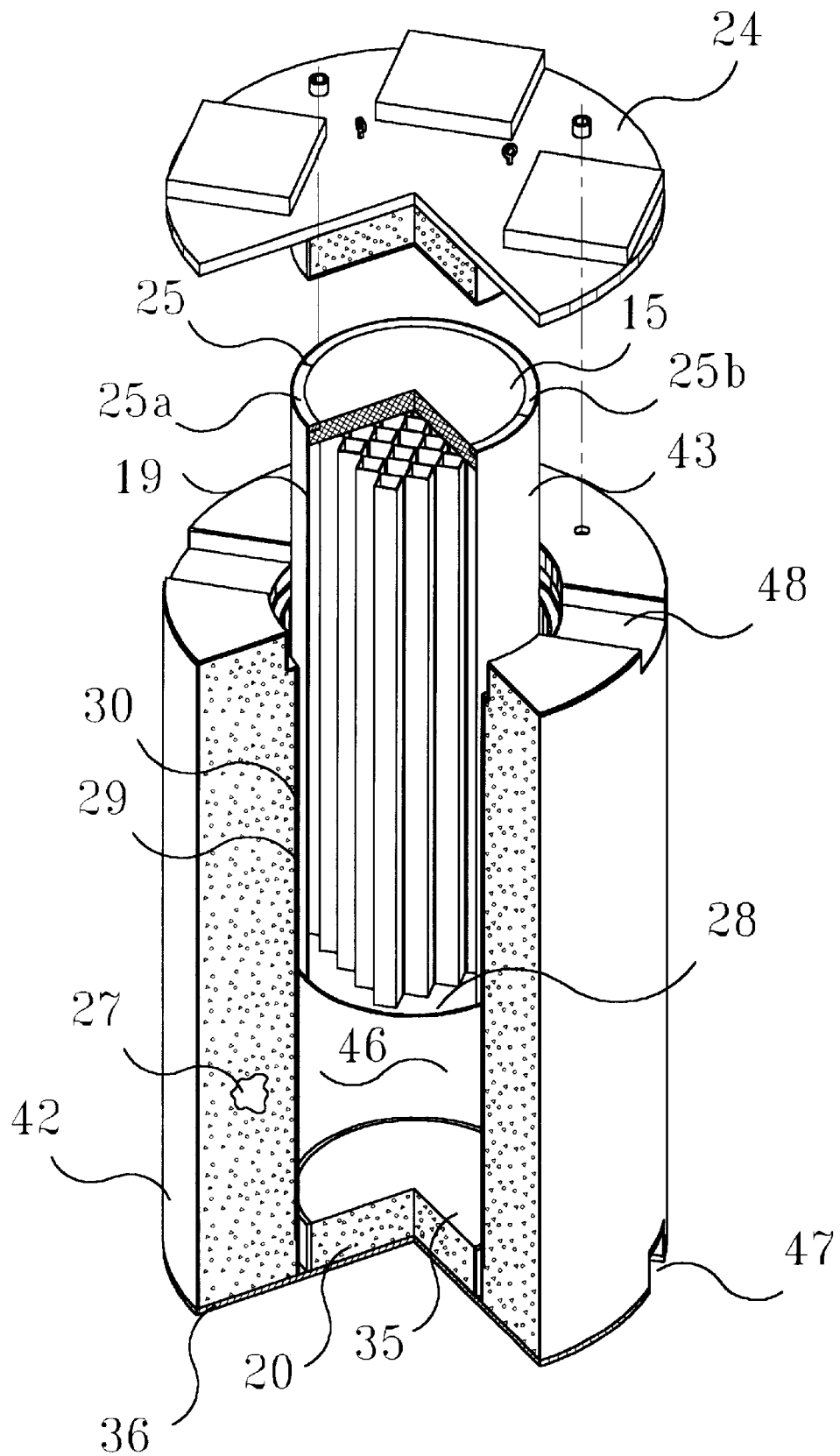
FIG. 14 is a perspective exploded view, partially in cross-section, of a storage overpack, with a partially installed MPC, having a fuel basket illustrated according to the invention.

The overpack aspect of the invention is shown in cross section in FIG. 13, and in combination with the MPC in the partial cross sectional, exploded view in FIG. 14.

The honeycomb structure of fuel basket 10 results in vertical cell openings 14 (also called "fuel cavities" or "storage cells"), each one of which is designed to hold one spent nuclear fuel assembly (not shown). The storage cells 14 are suitably "poisoned" with sufficient neutron absorbing material 16 (FIG. 1) to ensure that the stored fuel array will remain subcritical ($k_{eff}$<0.95) under the most adverse conditions.

In addition to maintaining subcriticality, the fuel basket 10 is designed to ensure that it "survives" an array of postulated accident events. The fuel basket 10 must be sufficiently rugged to withstand inertia forces associated with high decelerations such as 60 g's.

The fuel storage apparatus does not employ sleeves or boxes within the storage cells, or disks, as are used in prior art apparatus in this field. Rather, an array of cells is created by arranging a gridwork of plates in a rectilinear arrangement. The baskets 10 are formed from an array of plates 11a–11d and 12a–12d welded to each other, such that a honeycomb structure is created which resembles a multiflanged, closed-section beam in its structural characteristics. Preferably, the plates are welded using a remotely controlled welder. The resulting honeycomb construction provides for complete connectivity between adjacent storage cells at all contiguous corners. Thus, the flow of heat to the outside of the basket occurs throughout the entire volume of the fuel basket.

Figure 4:
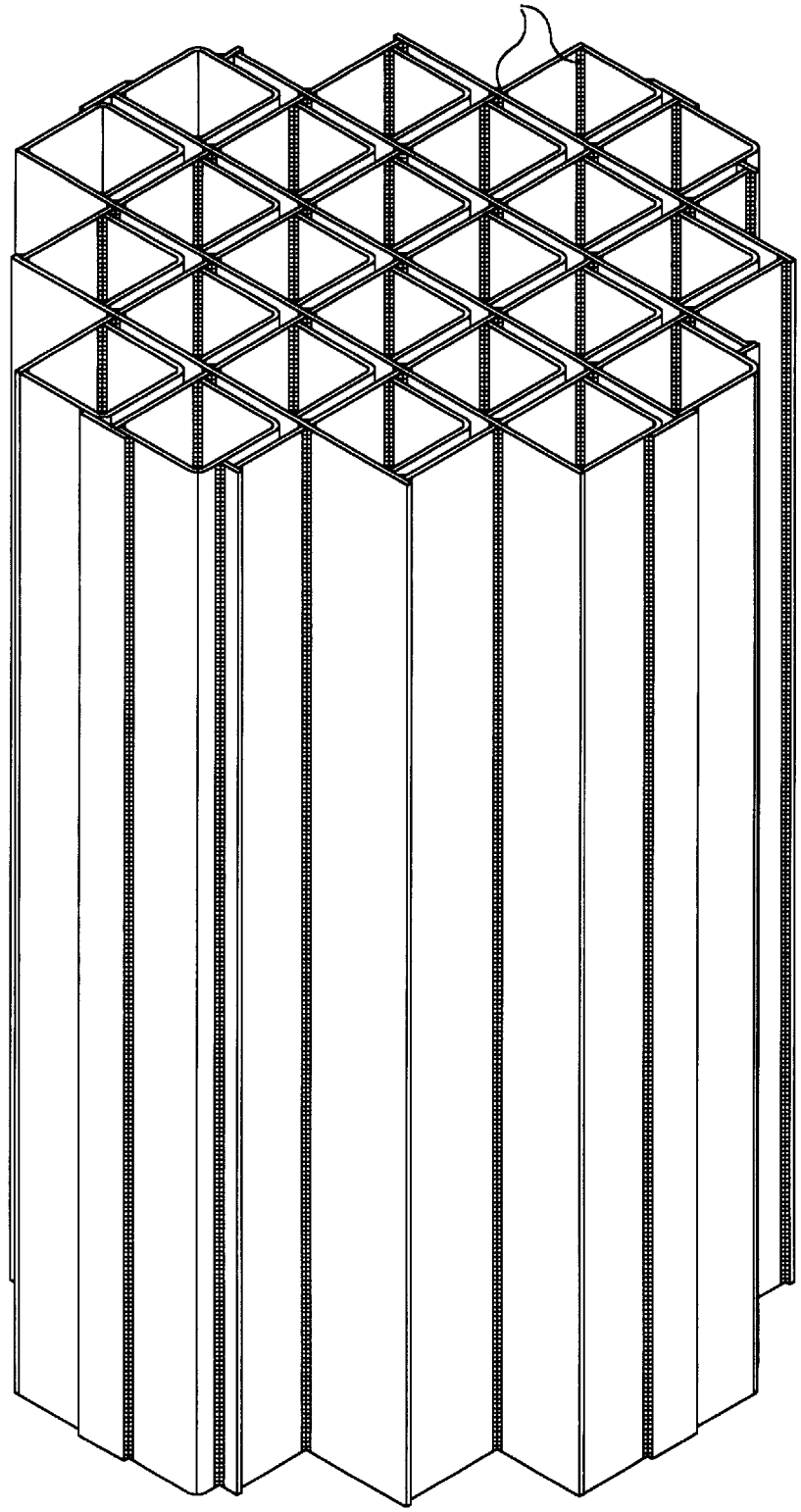
FIG. 4 is a perspective view of a twenty-four storage cell configuration basket assembly with neutron absorbing material not shown.
Figure 5:
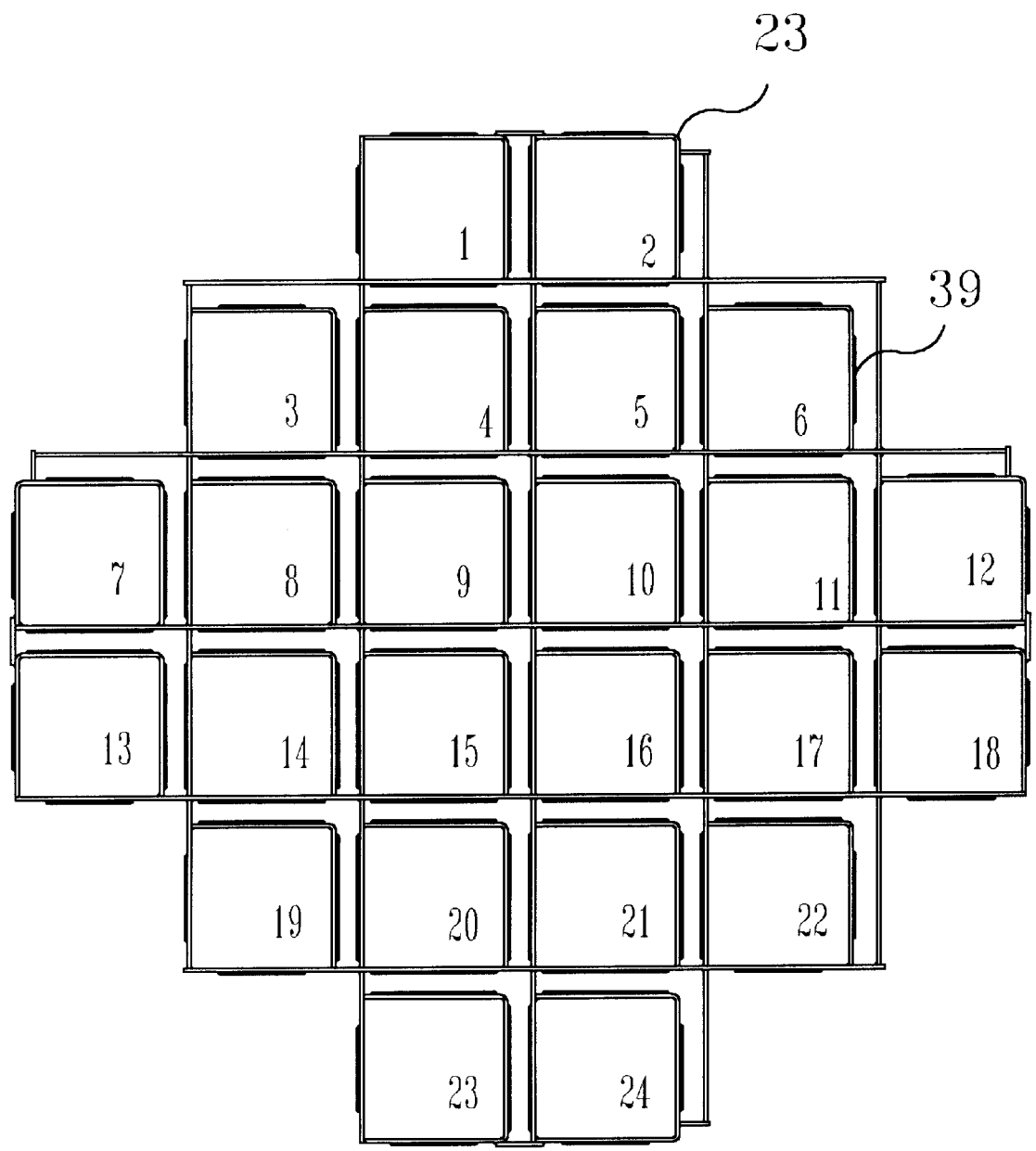
FIG. 5 is a top plan view of a twenty-four storage cell basket assembly, illustrating location of neutron absorbing material.
Figure 6:
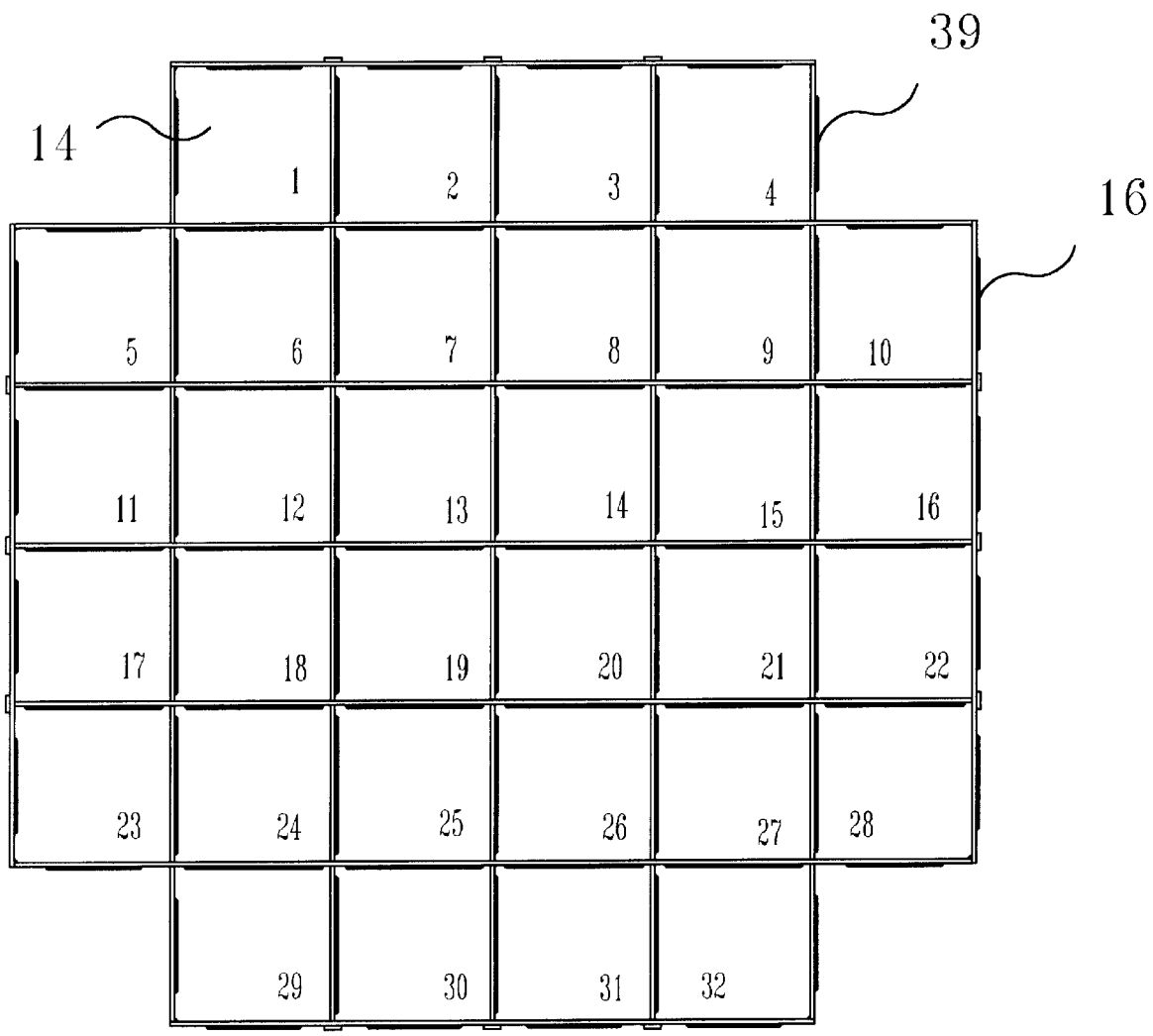
FIG. 6 is a top plan view of a thirty-two storage cell fuel basket assembly, showing location of neutron absorbing material.
Figure 7:
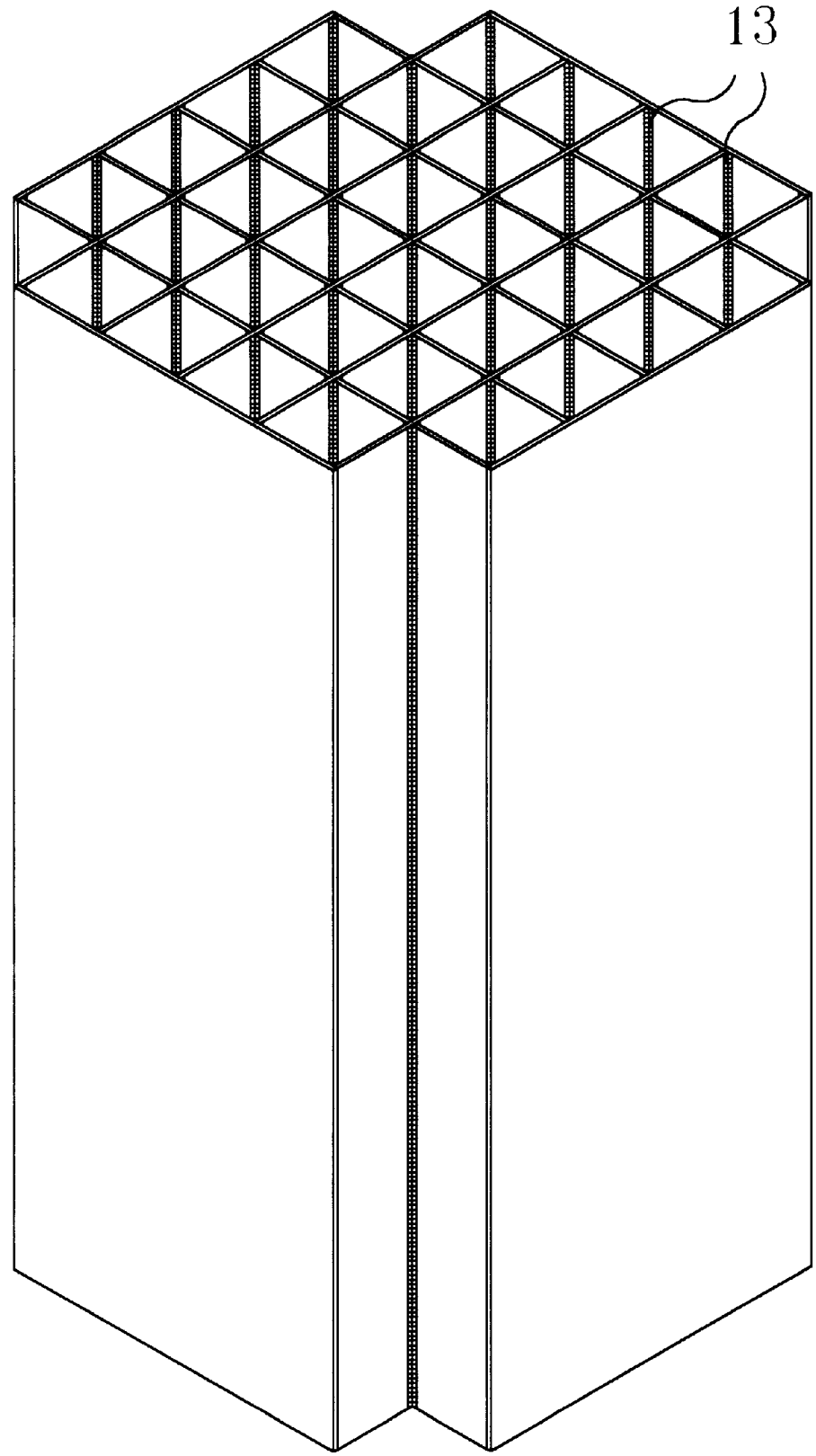
FIG. 7 is a perspective view of a thirty-two storage cell basket assembly according to the invention with neutron absorbing material not shown.
Figure 8:
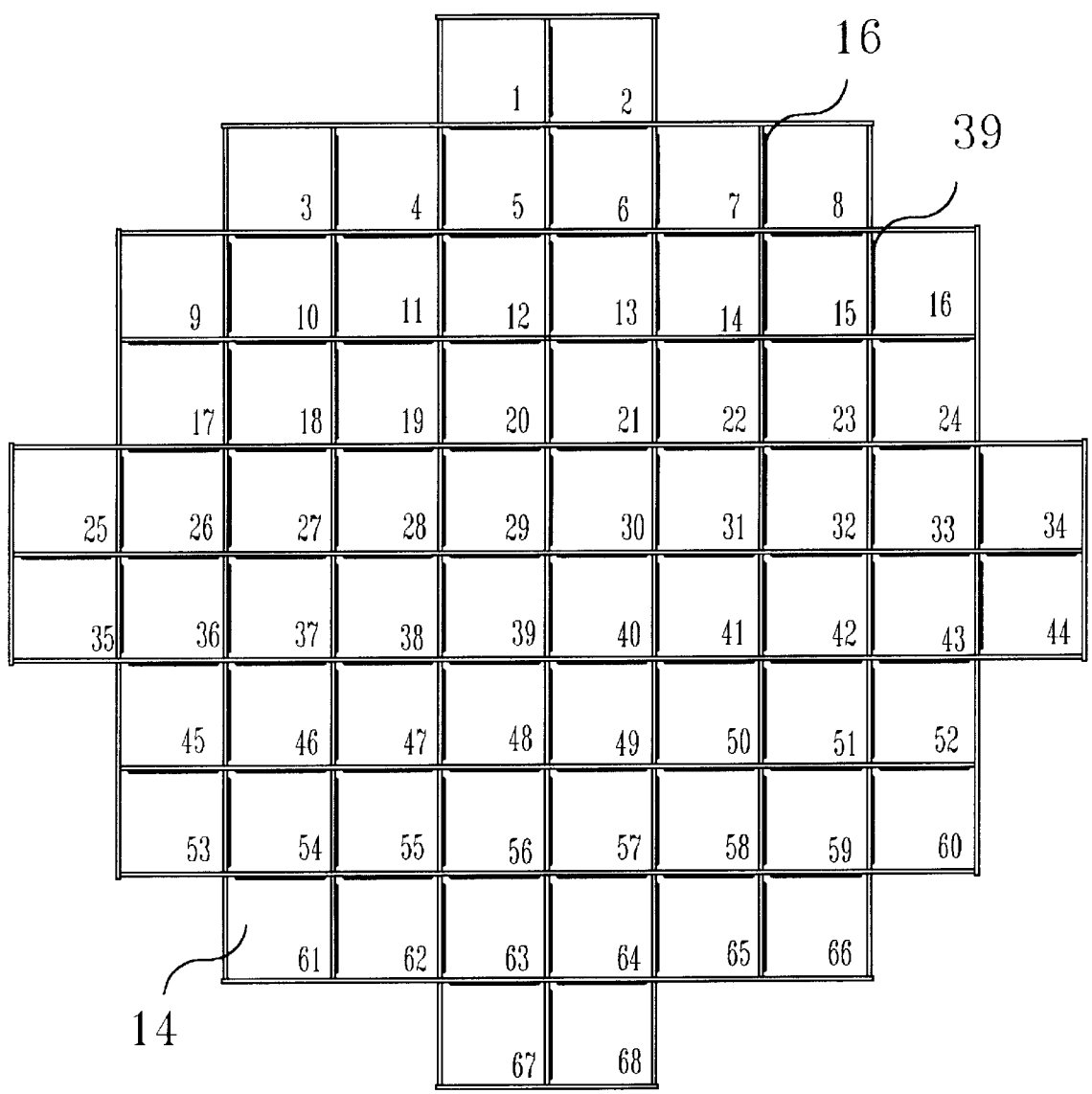
FIG. 8 is a top plan view of a sixty-eight storage cell basket assembly, showing neutron absorbing material.
Figure 9:
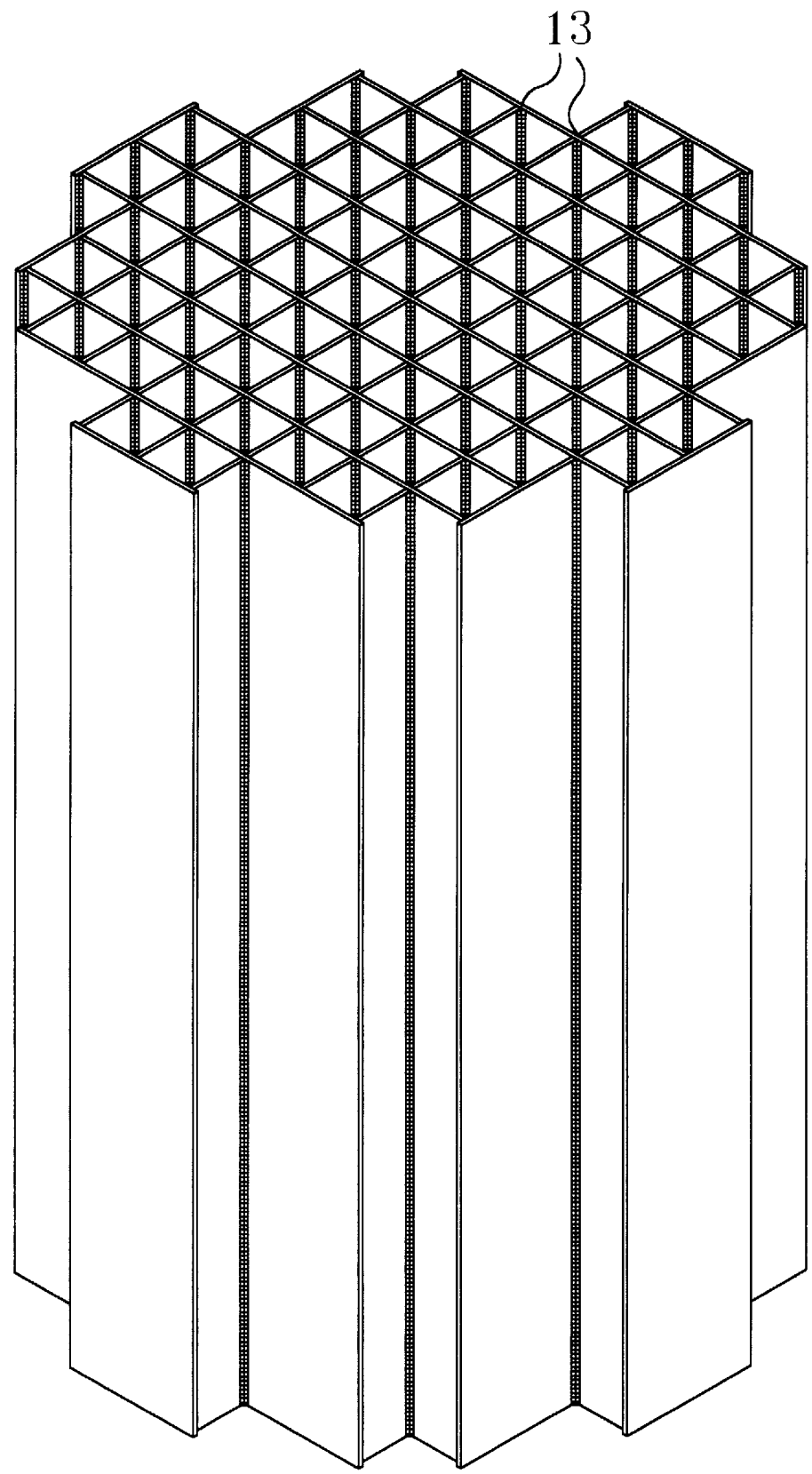
FIG. 9 is a perspective view of a sixty-eight storage cell basket assembly according to the invention with neutron absorbing material not shown.
Figure 10:
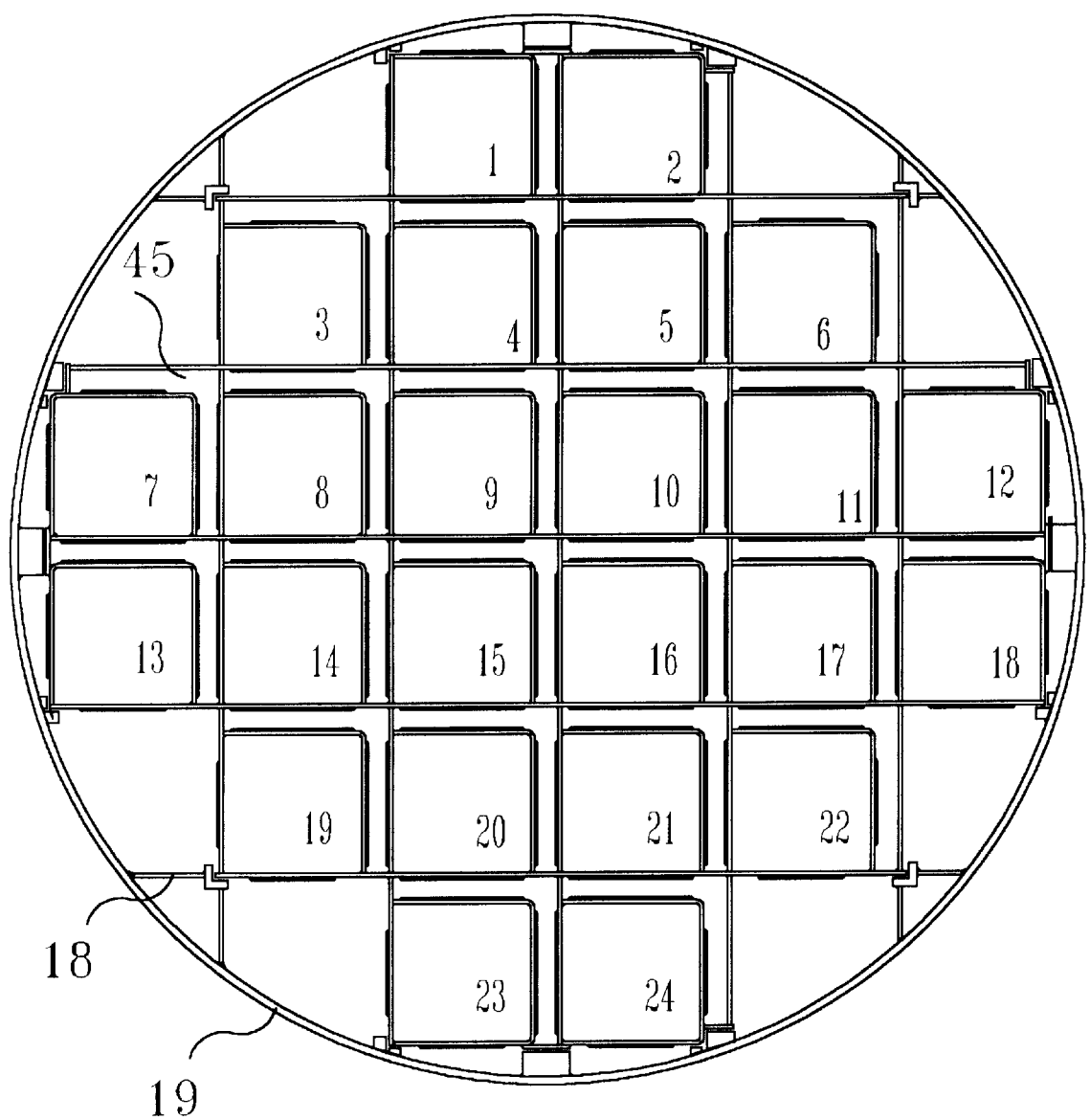
FIG. 10 is a top plan view, partially in cross-section, of a twenty-four cell canister according to the invention.
Figure 11:
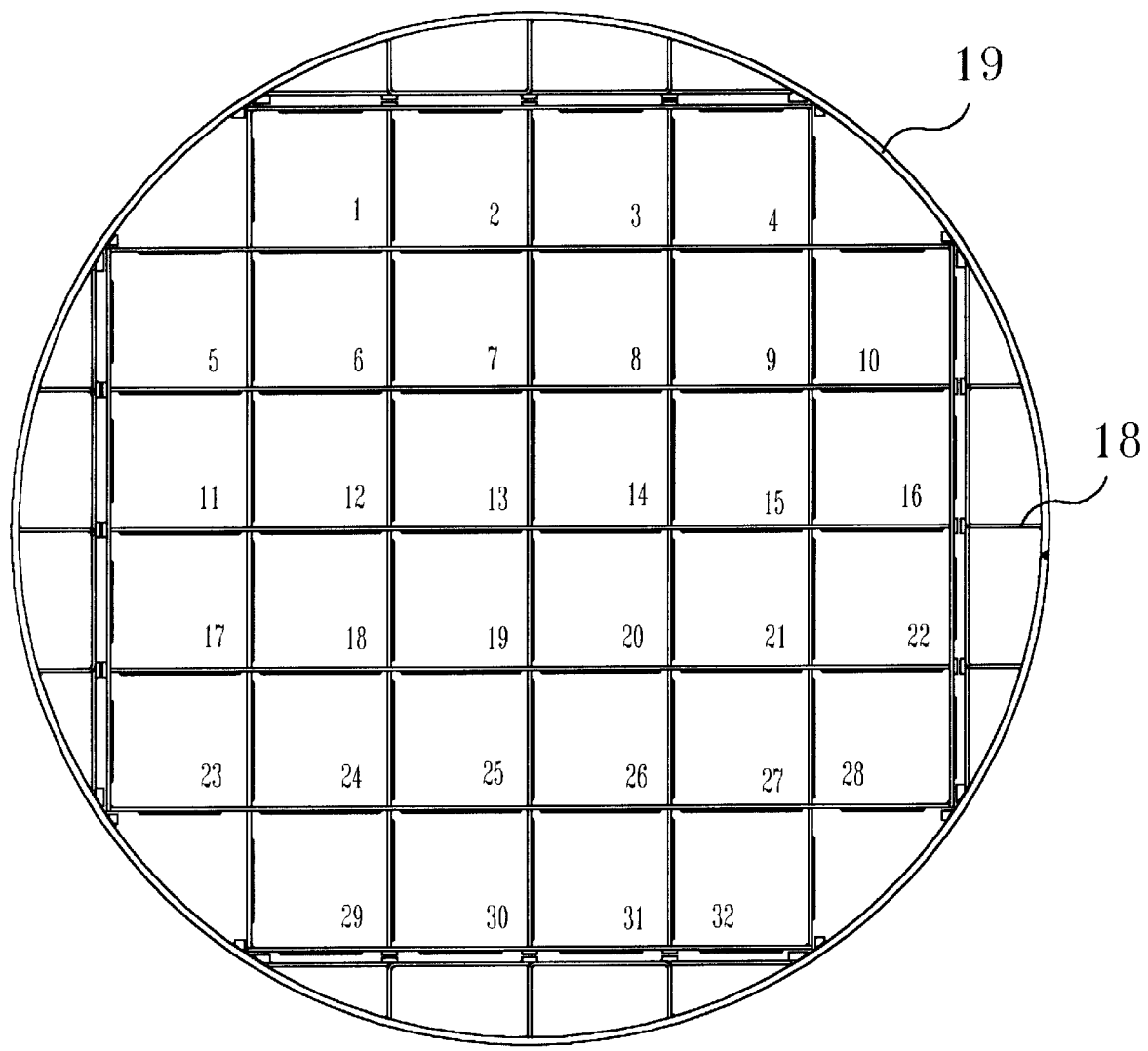
FIG. 11 is a top plan view, partially in cross-section, of a thirty-two cell canister according to the invention.
Figure 12:
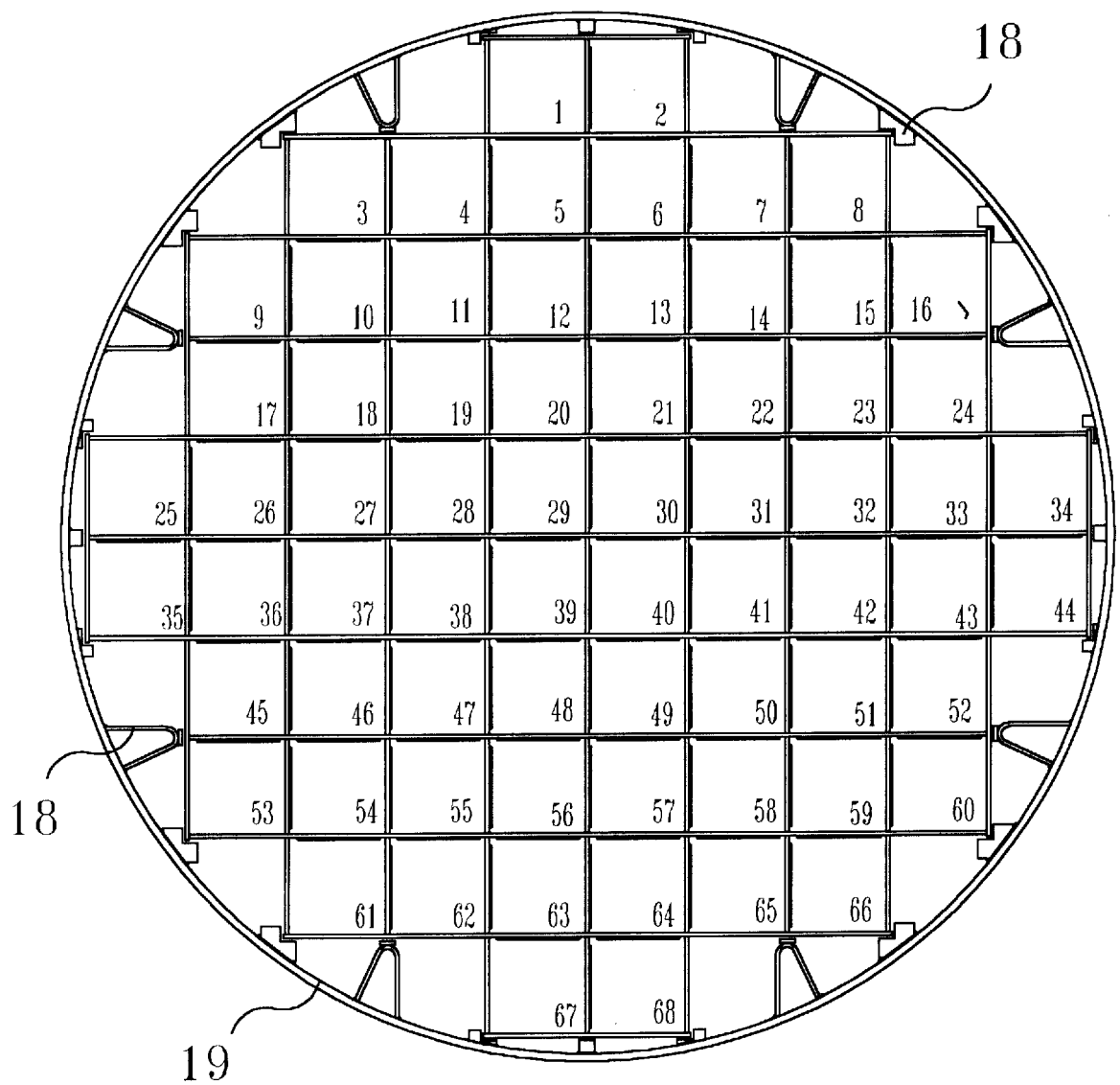
FIG. 12 is a top plan view, partially in section, of a sixty-eight cell canister according to the invention.

The number of plates differs, depending on the number of cells in a particular basket design. For example, FIGS. 4, 5, and 10 show a confifuration for 24 PWR assemblies. FIGS. 6, 7, and 11 show 32 cell storage configurations, and FIGS. 8, 9, and 12 show 68 storage cell configurations. FIGS. 10, 11, and 12 show the cells individually numbered from 1–24, 1–32, and 1–68, respectively. Each of the MPC embodiments, however, has the same external dimensions so that each can fit into a single sized overpack 42.

Figure 3:
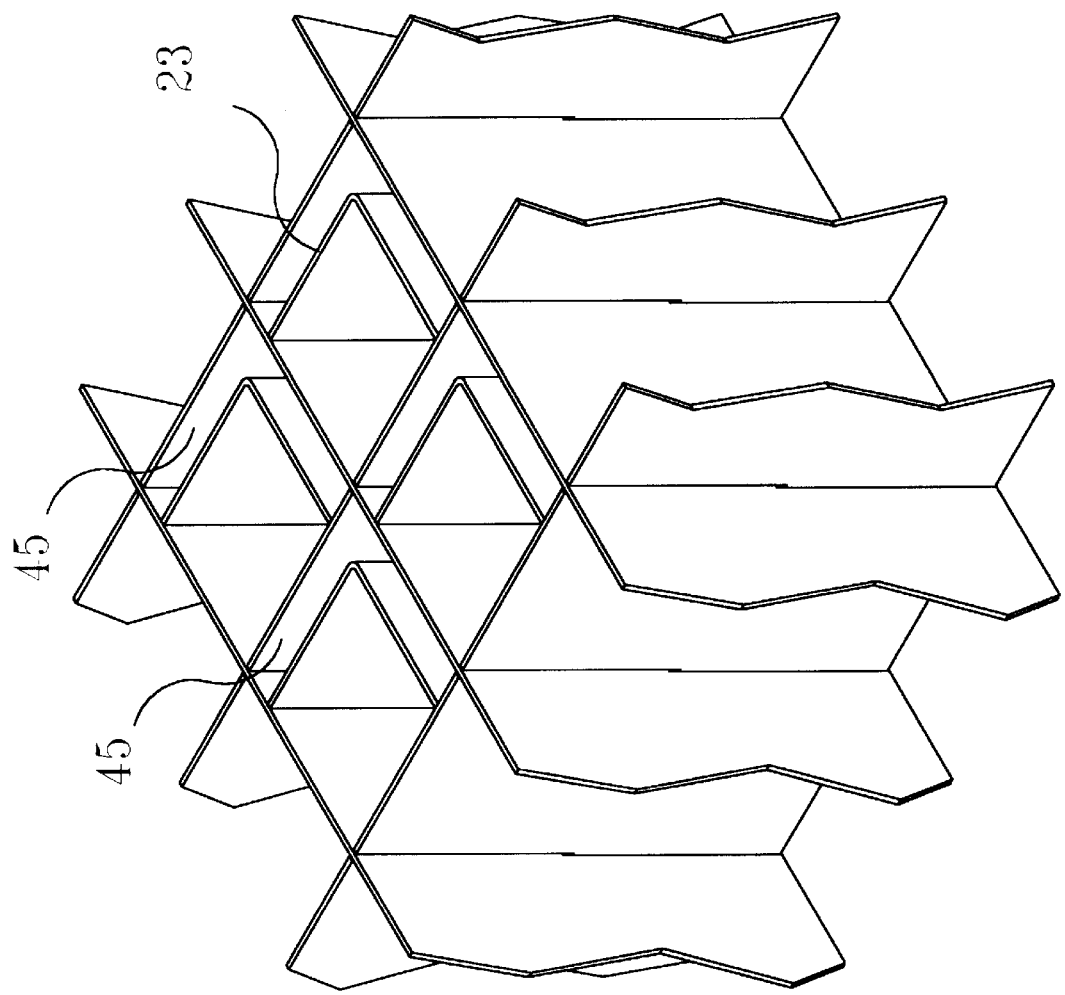
FIG. 3 is a perspective view of slotted plates and angular metal plates assembled, with sheathing and neutron absorbing material not shown.

In one embodiment, illustrated in FIG. 3, the fuel storage cells are physically separated from one another by a "flux trap" 45 between each storage cell for criticality control.

The honeycomb design of the fuel basket 10 renders the basket into a multi-flange plate weldment where all structural elements (box walls) are arrayed in two orthogonal sets of plates. Consequently, the walls of the cells are either completely co-planar (no offset) or orthogonal with each other. There is complete edge-to-edge continuity between the contiguous cells.

Among the many benefits of the honeycomb construction is the uniform distribution of the metal mass of the basket over the body of the basket (in contrast to the "box and spacer disk" construction where the support plates are localized mass points). A uniformly distributed mass provides a more effective radiation shielding barrier than can be obtained from a nonuniform (box and spacer disk) basket. In other words, the honeycomb basket is a more effective radiation attenuation device.

The complete cell-to-cell connectivity inherent in the honeycomb basket structure provides an uninterrupted heat transmission path, making the MPC an effective heat rejection device. Furthermore, the honeycomb fuel basket/MPC shell assemblage is engineered to facilitate convective heat transfer in conjunction with radiative and conductive heat transfer mode.

In certain embodiments, illustrated in FIGS. 3, 4, 5, and 10, angular metal plates 23 are welded longitudinally within storage cells. The L-shaped cross-sectional area 45 formed between the angular metal plates and the walls of the storage cells is a flux trap when filled with water.

Referring to FIG. 14, the MPC 43 must be a high integrity container with absolute assurance that its internal environment is hermetically isolated from the external environment. It is preferred that the MPC enclosure vessel is an all-welded ASME Section III Class 1 pressure vessel with a stipulated Design Pressure. There are no flanged or screwed joints in MPCs.

Because of thermal considerations, any physical connection between the enclosure vessel and the fuel basket is unacceptable. The decay heat generated by the fuel assemblies produces considerable thermal expansion in the basket. The basket must be free to expand radially and axially, else the thermal stresses will reach unacceptably high levels. In addition to promoting enhanced conduction heat transfer, the MPCs are also engineered to exploit other heat transmission modes, overcoming the disadvantages of the previously mentioned gap resistances and thus providing a reasonably high design basis heat duty.

A physical gap must exist between the fuel basket and the enclosure vessel as well as between the MPC and the overpack 42 inner surface 29.

The enclosure vessel or MPC is a cylindrical pressure vessel with flat ends.

The bottom flat end is a metel base plate 28. The top end of the MPC 43 incorporates a redundant closure system. The MPC lid 15 is a circular plate edge-welded to the MPC outer shell 19. This plate is equipped with vent and drain ports which are utilized to remove moisture and air from the MPC, and backfill the MPC with a specified mass of inert gas (helium). The vent and drain ports are covered and welded before the closure ring 25 is installed. The closure ring 25 is a circular ring edge-welded to the MPC shell 43 and lid 15. The MPC lid 15 provides sufficient rigidity to allow the entire MPC loaded with SNF to be lifted by threaded holes in the MPC lid 15.

The MPC is preferably constructed entirely from stainless steel alloy materials (except for the neutron absorber). Preferably, no carbon steel parts are used in the MPC. Other alloys than stainless which are suitable are those listed in section II of the ASME code. Concerns regarding interaction of coated carbon steel materials and various structural components in the MPC should be made of a material which is expected to be acceptable as a Mined Geological Depository System (MGDS) waste package.

The material for construction for an MPC, which may be acceptable as a waste package for the MGDS, include either: Type 316, Type 316LN, Type 304, Type 304LN, alloy 600, alloy 690, alloy 800, and alloy 825.

Figure 15:
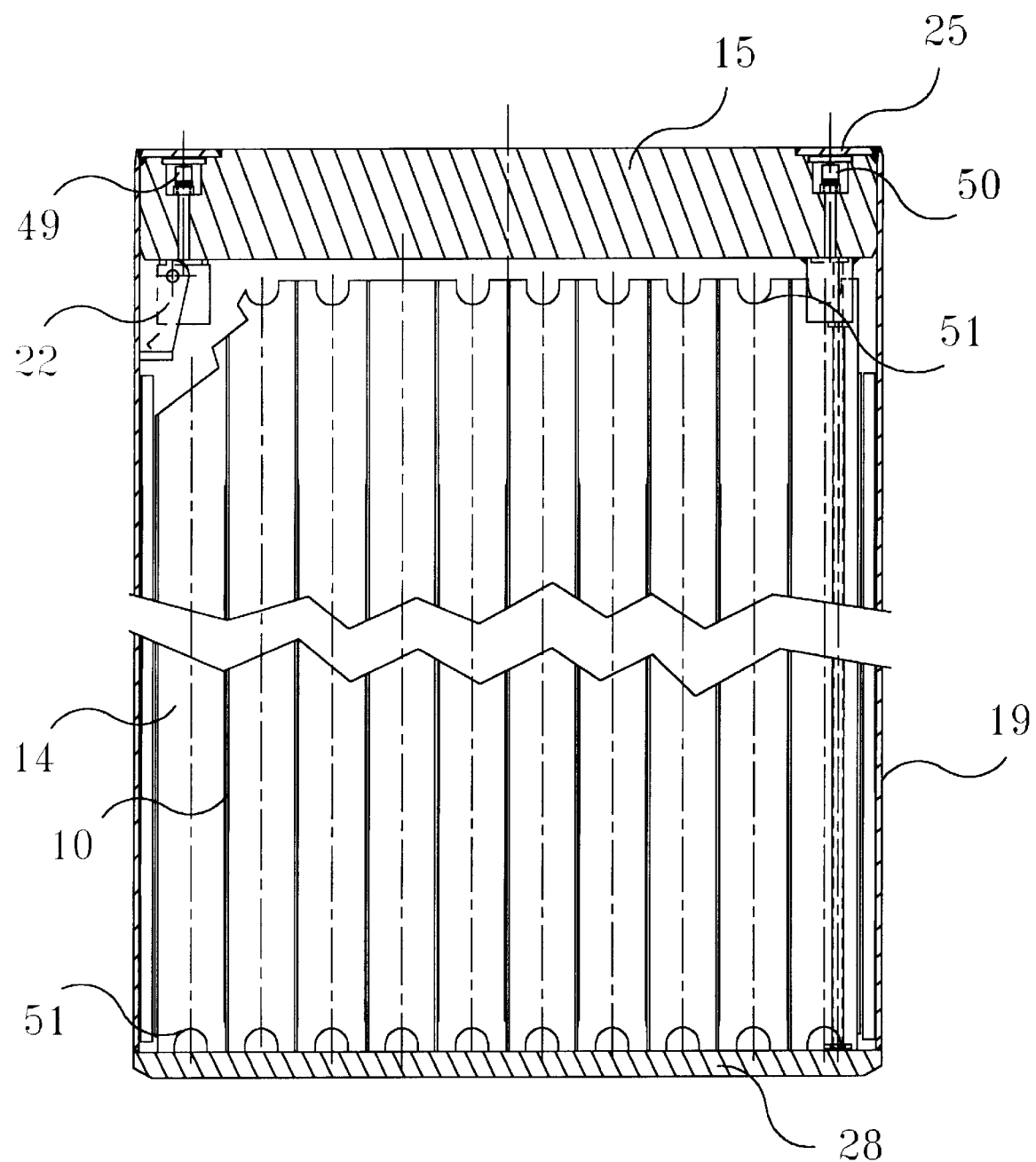
FIG. 15 is a cross-sectional elevational view of a MPC according to the invention.
Figure 16:
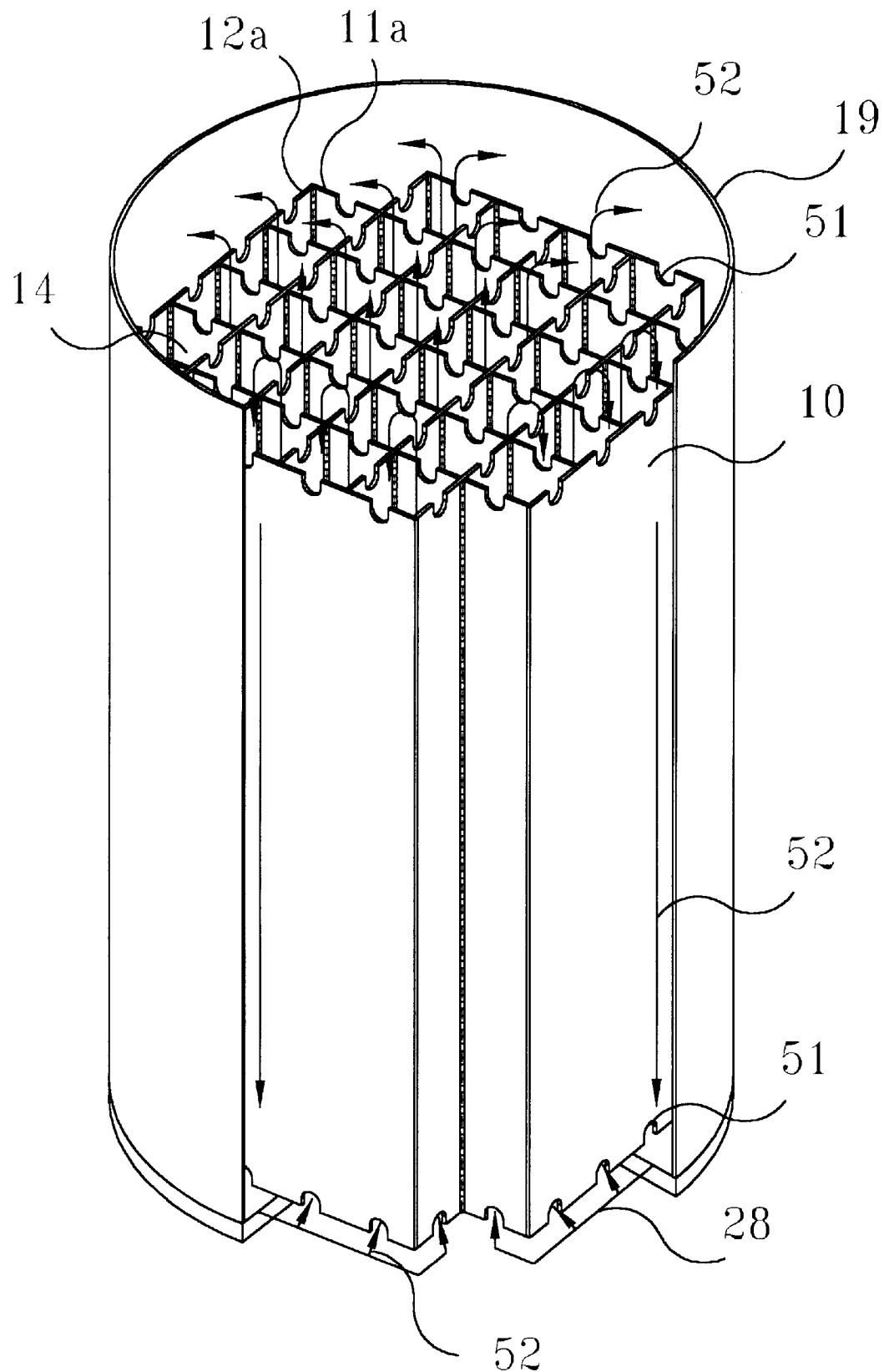
FIG. 16 is a perspective view of an MPC according to the invention, illustrating the mouse holes and recirculating helium flow.

The MPC consists of a sealed metallic canister 43, contained within an overpack 42. A wide variety of spent fuel assemblies can be accommodated in a single overpack by utilizing different MPCs. The external dimensions of all MPCs are identical to allow the use of a single overpack. Each of the MPC embodiments has different baskets 10 to accommodate distinct fuel characteristics. FIG. 15 depicts the MPC in a cutaway view.

There are no external or gasketed ports or openings in the MPC. The MPC does not rely on any sealing arrangement except welding. The absence of any gasketed or flanged joints makes the MPC structure immune from joint leaks. The MPC contains no valves or other pressure relief devices.

The closure system for the MPCs preferably consists of two components, namely, the MPC lid 15 and the closure ring 25. The MPC lid is a thick circular metal plate continuously welded to the MPC shell 19 along its circumference. The lid is equipped with vent 49 and drain 50 ports which are utilized for evacuating moisture and air from the MPC following fuel loading and backfilling with an inert gas (helium) at a specified mass. The vent and drain ports are covered and welded before the closure ring 25 is installed.

The closure ring is a thin circular annular plate, edge-welded to the MPC shell 19 and to the inner portion, i.e., recess, of the closure lid 15. The closure ring 25 is preferably provided in two half rings, 25a and 25b, which are installed in the recess of the closure plate lid 15 and subsequently welded to the MPC shell 19 and MPC lid 15. The two closures are interconnected by welding around the inner diameter of the ring. The closure plate lid 15 preferably includes a recess around its perimeter adapted to engage the closure ring 25 so that when the lid 15 is seal welded and then the closure ring 25 is fittingly engaged and seal welded to the inside perimeter of the recess of the MPC lid 15 and to the MPC shell 19, a redundant sealing system is provided. Lift points for the MPC are provided in the MPC lid.

Because of the special closing system which includes the closure ring, most of the lid can be of maximum thickness to provide the maximum radiation shielding because only one lid is provided in the preferred embodiments, thereby eliminating the need for additional lids which are used in prior art systems in order to provide redundant sealing. In the preferred embodiments, redundant sealing is provided by the closure ring 25 rather than additional lids. A further advantage of the closure ring system is that due to its small width, the unsupported span is small and thus the bending moment and corresponding stresses are also small, allowing decreased closure ring thickness and increased closure lid thickness.

The MPC fuel basket 10 has storage cells 14 formed from a honeycomb gridwork of metal plates illustrated as 11a, 11b, 11c, and 11d parallel and to each other and 12a, 12b, 12c, and 12d, also parallel to each other, the first set of plates at right angles to each other in rectilinear configuration, the plates welded to each other at their intersections 13 so that all contiguous corners of the storage cells formed by the gridwork are completely connected so as to allow conduction heat transfer, the metal plates having neutron absorber material 16 (FIG. 1) positioned in areas which form walls of the storage cells. The neutron absorber material is comprised of an isotope capable of absorbing thermal neutrons, and is encased in a metallic sheathing. The neutron absorber material is preferably positioned in selected areas of the metal plates which form selected walls of said storage cells, rather than on all areas of the plates, or on each wall of each storage cell. Preferably, the nuclear absorber material 16 is comprised of boron carbide encased in aluminum, and said the nuclear absorber material is encased in steel sheathing 39. Other nuclear absorbing materials are well known in the art and can be used instead of boron carbide.

The metal plates have semicircular mouse holes 51 at the bottom and top to provide pathways improved for cooling versus prior art devices which only have bottom mouse holes.

The mouse holes 51 promote circulation of cooling fluid by creating a flow pathway 52. The fluid exits the basket through the top mouse holes, flows down the outside of the basket, and is cooled to ambient through the MPC shell, and then cooled fluid enters the basket through bottom mouse holes 51.

The fluid is water until the spent fuel rods are loaded into the MPC, and after the lid is placed on the MPC, the water is pumped out and replaced with helium, which becomes the permanent fluid.

The MPC fuel basket is made by a process which comprises:
a) providing metal plates 11a–11d and 12a–12d having slots 37 and having neutron absorber material 16 positioned on sides of the metal plates, b) arranging the plates so that said slots intersect (FIG. 2) to form a honeycomb gridwork of storage cells having contiguous corners and having said neutron absorbing material on sides of said storage cells, and c) welding said plates to each other at their intersections 13 so that all contiguous corners of the storage cells formed by said gridwork are completely connected so as to allow conduction heat transfer and to provide a rigid structure.

Preferably, the method includes providing a first set of plates 11a–11d in which individual plates have slots from the bottom edge to the middle, and a second set of plates 12a–12d in which individual plates have slots from the top edge to the middle, wherein the intersections are formed when plates from the first set are arranged at a 90 degree angle to plates from the second set so that the slots of the two sets of plates intersect.

The number of storage cells formed by this interconnection process varies depending on the type of fuel being transported. All baskets are designed to fit into the same MPC shell. Welding the plates along their edges essentially renders the fuel basket into a multiflange beam, and is therefore rigid.

The MPC preferably has top and bottom plenums formed by holes at the top and bottom of the honeycomb gridwork of the basket, and a downcomer area on the periphery of the basket, forming a passageway for circulating fluid, thereby facilitating convective heat transfer.

Welding the basket to the MPC shell along all longitudinal edges of contact would further strengthen the basket. However, such a construction would lead to relatively high thermal stresses in the basket structure and the MPC shell due to temperature gradients in the MPC fuel basket. The MPC basket support structure and basket interface consists of longitudinal gaps which (depending on the magnitude of internal heat generation from the stored spent fuel), may partially reduce due to differential thermal expansion effects between the fuel basket and the MPC shell because of the heat emitted by the contained fuel.

The provision of a small gap between the basket and the basket support structure is consistent with the natural thermal characteristics of the MPC. The planar temperature distribution across the basket approximates a shallow parabolic profile. This profile will create high thermal stresses unless mechanical constraints at the interface between the basket and the basket support structure are removed.

The MPCs will be loaded with fuel assemblies which may have widely varying heat generation rates. The basket/basket support structure gap tends to reduce for higher heat generation rates due to increased thermal expansion rates. Gaps between the fuel basket and the basket support structure are specified to be sufficiently large such that a gap exists around the periphery under the worst case thermal expansion.

The MPC is designed for both storage and transport. The multi-purpose design reduces SNF handling operations and thereby enhances radiological protection. Once the SNF is loaded and the MPC is sealed, the apparatus can be positioned on-site for temporary or long-term storage or transported directly off-site with a suitable transportation overpack. The ability to both store and transport SNF eliminates repackaging.

The apparatus is a completely passive stand-alone storage system which provides SNF confinement, radiation shielding, structural integrity, criticality control, and heat removal independent of any other facility, structures or components.

The apparatus consists of interchangeable MPCs which constitute the confinement boundary for BWR or PWR spent nuclear fuel, and a storage overpack which provides the bulk of the shielding and protection of the MPC. Due to the differing storage contents of each of the MPCs, the maximum loaded weight differs between each MPC. The overpack inner cavity 46 is sized to accommodate the MPCs.

The storage overpack 42 (FIGS. 13 and 14) is a heavy-walled steel and concrete cylindrical vessel comprising a cylindrical inner metal shell 29, a cylindrical outer metal shell 32, and a cylindrical concrete structure 31 between said metal shells. The overpack is a massive structure which absorbs the neutron and gamma fluxes emanating from the fuel in the MPC.

The cylindrical center 46 of the overpack 42 is sized and shaped to fit every model of MPC. The gap between the overpack and the MPC must be large enough such that any MPC out of a large number manufactured would fit into any overpack within a like population of overpacks. Inasmuch as the MPC and the overpack are both fabricated components, the effects of weld-induced camber, bow, twist, and machining tolerances, are considered in prescribing the nominal MPC/overpack gap. Optionally, and preferably, the overpack comprises a second, intermediate, metal shell 30. The storage overpack also preferably comprises a baseplate 20 filled with concrete and a metal cover 24 adapted to be bolted onto the cylindrical structure. The concrete in the baseplate is preferably of low compression modulus so as to absorb impact, for example, in the event of an accidental drop event. The metal cover (or lid) has appropriate concrete shielding attached to its underside and top to provide neutron and gamma attenuation in the vertical direction. The concrete in the baseplate also functions to confine gamma radiation. The overpack also has a cylindrical metal bottom 36 welded to the metal shell 42.

Metal radial plates 27 connect the metal shells 30 and 32 of the overpack. These radial plates or channels welded to the metal shells provide increased surface area for heat transfer and support for the canister. The storage overpack preferably includes top 48 and bottom 47 ducts to provide a chimney flow path for air to remove decay heat. It is preferred that the top ducts 48 not be aligned vertically with each other. Impact cushions 18 can serve to cushion impact between the MPC and the overpack. The impact cushions can be hollow to allow air flow.

The main structural function of the storage overpack is provided by carbon steel, and the main shielding function is provided by concrete. The storage overpack has convective ducting to allow for passive cooling of the contained MPC. The overpack is enclosed by cylindrical steel shells, a thick steel baseplate, and a heavy bolted-on lid.

In a preferred embodiment, four removable lifting lugs (not shown) are attached to the top of the overpack for lifting the cask body. Slings (not shown) or other suitable devices attached to a lifting rig are designed to mate with the four lifting lugs. The four lifting lugs are located on 90° centers. The overpack may also be lifted from the bottom using specially-designed lifting transport devices, including hydraulic jacks, air pads, and Hillman rollers. Slings or other suitable devices mate with lifting lugs which are inserted into threaded holes in the top surface of the overpack lid to allow lifting of the overpack lid. After the lid is bolted to the storage overpack main body, these lifting bolts shall be removed and replaced with flush plugs.

The multilayer shell construction provides a natural barrier against crack propagation in the radial direction across the overpack structure.

A small annular gap between the MPC external surface and the inside surface of the overpack is provided to allow insertion and removal of the MPC. This gap diminishes monotonically with the increase in the heat generation rate in the MPC, but is sized to avoid metal-to-metal contact between the MPC and the overpack cylindrical surface as a result of thermal expansion under the most adverse thermal conditions.

The transportation overpack is an gamma and neutron isolator used to ship loaded MPC from one location to another, by train or large truck. The design of the transportation overpack utilizes heavy walled metallic sections to withstand severe accident events which may occur during transport.

While the invention and preferred embodiments have been described in detail, various modifications, alternatives, and improvements should become readily apparent to those skilled in this art without departing from the spirit and scope of the invention as set forth in the following claims.

What is claimed is:

1. Apparatus suitable for transporting and storing spent nuclear fuel rods comprising a basket having storage cells formed from a honeycomb gridwork of metal plates in a rectilinear configuration, said plates welded to each other at their intersections so that all contiguous corners of the storage cells formed by said gridwork are completely connected so as to allow conduction heat transfer, wherein there is no offset between walls of said storage cells, said metal plates having neutron absorber material positioned in areas which form walls of said storage cells.

2. Apparatus according to claim 1 wherein said metal plates are slotted prior to being assembled, and said intersections are formed when one plate is arranged at a 90 degree angle to a second plate so that the slots of the two plates intersect.

3. Apparatus according to claim 1 further including top and bottom plenums formed by holes at the top and bottom of said honeycomb gridwork of said basket, and a downcomer area on the periphery of said basket, forming a passageway for circulating fluid, thereby facilitating convective heat transfer from the stored spent nuclear fuel.

4. Apparatus according to claim 3 wherein said apparatus does not employ disks having openings through which fuel storage boxes are mounted.

5. Apparatus according to claim 1 wherein said neutron absorber material is positioned in areas of said metal plates which form selected walls of said storage cells.

6. Apparatus according to claim 5 wherein said neutron absorber material is comprised of an isotope capable of absorbing thermal neutrons, and said neutron absorber material is encased in a metallic sheathing.

7. Apparatus according to claim 1 wherein said basket has from 12 to 120 storage cells.

8. Apparatus according to claim 1 wherein said plates are a metallic alloy.

9. Apparatus according to claim 8 wherein said alloy is of a type selected from Type 316, Type 316LN, Type 304, Type 304LN, alloy 600, alloy 690, alloy 800, and alloy 825.

10. Apparatus according to claim 1 wherein angular metal plates are welded longitudinally within storage cells.

11. Apparatus according to claim 10 wherein said angular metal plates have neutron absorbing material on at least part of their surfaces.

12. Apparatus according to claim 11 wherein said neutron absorber material is comprised of an isotope capable of absorbing thermal neutrons, and said neutron absorber material is encased in a metallic sheathing.

13. Apparatus according to claim 11 wherein said angular metal plates are positioned so as to form flux traps when filled with water.

14. Apparatus according to claim 1 further including a metal shell cylindrically encircling said basket.

15. Apparatus according to claim 14 further including a metal base plate welded to the bottom of said metal shell.

16. Apparatus according to claim 15 further including a circular metal closure plate adapted to fit on top of the cylinder formed by said metal shell, thereby forming a canister.

17. Apparatus according to claim 16 wherein said closure plate has a recess on its top perimeter, and further including a closure ring adapted to fit in said recess.

18. Apparatus according to claim 17 wherein said closure ring is two semi-circles which are adapted to be joined to form a ring when fit in said recess.

19. Apparatus according to claim 17 wherein said closure plate is the only closure plate for said MPC.

20. Apparatus according to claim 16 further including basket support welded to a portion of the inside of said shell so as to support said basket and provide a pathway for flow of cooling fluid.

21. Multi-purpose canister (MPC) apparatus according to claim 16, said apparatus comprising a said metal shell, said metal base plate, and said circular metal closure plate which in combination form a cannister enclosure vessel having its internal environment hermetically isolated from the external environment, said cannister having no physical connection to said basket, said cannister enclosure vessel and basket assembly suitable for multiple purposes comprising transporting spent nuclear fuel rods when inserted and contained in a transportation overpack, and for storing spent nuclear fuel rods when inserted and contained in a storage overpack.

22. Method of making an apparatus suitable for transporting and storing nuclear fuel rods comprising a) providing metal plates having slots and having neutron absorber material positioned on sides of said metal plates, b) arranging said plates so that said slots intersect to form a honeycomb gridwork of storage cells having contiguous corners and having said neutron absorbing material on sides of said storage cells, and c) welding said plates to each other at their intersections so that all contiguous corners of the storage cells formed by said gridwork are completely connected so as to allow conduction heat transfer and to provide a rigid structure.

23. Method according to claim 22 comprising providing a first set of plates in which individual plates have slots from the bottom edge to the middle, and a second set of plates in which individual plates have slots from the top edge to the middle, wherein said intersections are formed when plates from the first set are arranged at a 90 degree angle to plates from said second set so that the slots of the two sets of plates intersect.

24. Method according to claim 22 comprising forming a passageway for circulating fluid by providing top and bottom plenums formed by holes at the top and bottom of said honeycomb gridwork of said basket, a downcomer area on the periphery of said basket, to facilitate convective heat transfer.

25. Method according to claim 22 wherein said no disks having openings through which fuel storage boxes are mounted are employed.

26. Method according to claim 22 wherein said plates are welded using a remotely controlled welder.

27. Method according to claim 22 wherein angular metal plates having neutron absorbing material on at least part of their surfaces are welded within said storage cells so as to form flux traps when filled with water.

28. Method according to claim 22 wherein a metal shell cylindrically enclosing said basket is provided, said shell having a metal base plate welded to the bottom of said metal shell, and a circular metal closure plate adapted to it on top of the cylinder formed by said metal shell, thereby forming a canister.

29. Method according to claim 28 wherein a recess is provided around the top perimeter of said closure plate, wherein said closure plate is seal welded to the top of said metal shell, and providing a closure ring adapted to fit in said recess, seal welding said closure ring to said closure plate and said metal shell.

30. Method of claim 29 wherein said closure ring is provided in to semicircular parts which are sequentially seal welded to said closure plate, said metal shell, and to each other.

* * * * *